Sept. 25, 1934.  F. A. HEADSON  1,974,652
FURNACE AND HEATING AND VENTILATING SYSTEM
Filed Jan. 22, 1931
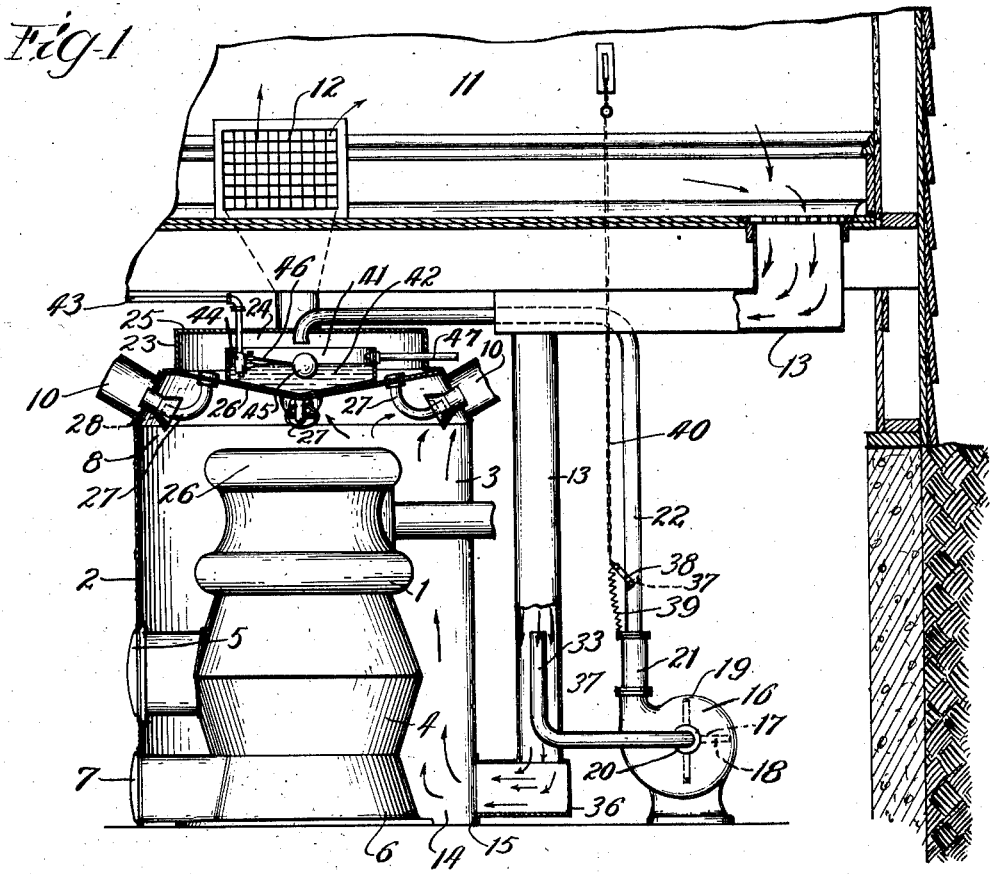
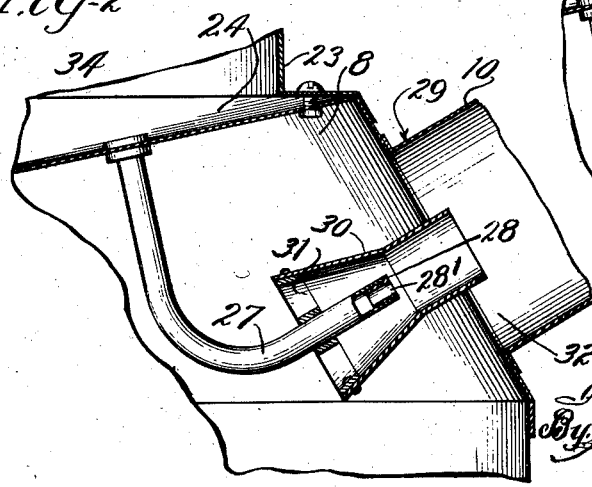
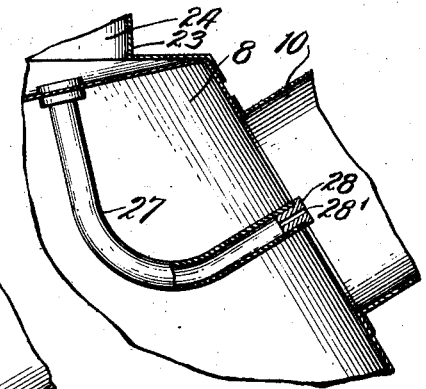
Inventor:
Frank A. Headson
By Harry J. Cromer
Atty.

Patented Sept. 25, 1934

1,974,652

UNITED STATES PATENT OFFICE 1,974,652

FURNACE AND HEATING AND VENTILATING SYSTEM

Frank A. Headson, Wauwatosa, Wis.

Application January 22, 1931, Serial No. 510,346

3 Claims. (Cl. 126—105)

This invention relates to that class of furnaces and heating and ventilating systems in which power-actuated means is employed for forcing a current of heated air into each of the hot air pipes connected with a furnace to effect the circulation of the air from the furnace through the hot air pipes to one or more rooms or compartments to be heated and to the interior of the furnace.

The principal object of the invention is to provide a simple, economical and efficient furnace and heating and ventilating system.

A further object of the invention is to provide a hot air furnace and heating and ventilating system with improved efficient means for enabling a forced draught or hot air current to be created in each and any of the respective hot air passages leading from the furnace to one or more rooms or compartments to be heated, to control and insure the proper flow and efficient circulation of heated air through each and all of the air passages connected with the furnace and through the respective rooms or compartments.

Other and further objects of the invention will appear from the following description and claims and from an inspection of the drawings which are made a part hereof.

The invention consists of the features, combinations, details of construction and mode of operation of the parts as herein described and claimed.

In the accompanying drawing—

Figure 1 is a view in elevation partly in central vertical section of a furnace and heating and ventilating system constructed in accordance with my invention;

Fig. 2 is an enlarged detail view in vertical section showing an upper part of the air-containing heating chamber of a furnace, a part of the manifold located above said chamber, and one of the air discharging pipes leading from the manifold into the air-containing heating chamber of the furnace and having its discharge end or nozzle in position to discharge a current of air into an adjacent hot air passage leading from said furnace chamber; and Fig. 3 is a detail view in vertical section of a modified form of manifold and air-discharge pipe or nozzle.

In constructing a furnace and heating and ventilating system provided with an improved forced draught and draught controlling means in accordance with my invention, I provide a furnace 1, having the usual outer casing 2 forming an air-containing heating chamber 3 between the inner and outer walls of the furnace, and having means for heating the furnace, such for example as the usual fire-box 4 provided with a door 5 for permitting the introduction of fuel into the fire-box, and having the usual ash-box 6 and door 7 for permitting the removal of ashes and waste material.

The hot air furnace may be of any ordinary and well-known or suitable form, and my improved forced draught producing and controlling means is adapted to be attached to or to form a part of any ordinary and well-known form of hot air furnace such as those in common use; and any desired ordinary and well-known means for heating the same may be employed.

The furnace 1 shown in the accompanying drawing is provided with the usual upper hot air chamber 8 above the combustion chamber and communicating with the cylindrical air chamber 3 which surrounds the combustion chamber and firebox.

Any desired number of hot air pipes or passages 10 may be employed, and each of said hot air pipes or passages is connected at its lower end with the furnace and communicates with the interior of the heating chamber 8 which forms the upper portion of the air containing or heating chamber of the furnace. The upper extremity of each of the hot air pipes or passages 10 leads to the interior of any desired room or compartment 11 to be heated and is provided with the usual register or discharge opening 12 through which the heated air passes from the hot air pipes into the space to be heated. The usual return pipe or pipes 13 lead from the room or chamber to be heated and ventilated to and communicate with the lower portion 14 of the air containing heating chamber of the furnace which is provided with the usual opening 15 for each of the return pipes each of which pipes leads into a corresponding opening 15 and is adapted to discharge air to be heated into said air heating chamber.

It it well known that great difficulty is experienced in evenly distributing the heated air to the various rooms or compartments to be heated so as to provide and control the proper temperature of each room or compartment as desired independently of other rooms or compartments embraced within the heating system. It is therefore highly desirable that suitable improved means be provided for controlling the introduction and distribution of heat to the various rooms or compartments to be heated and ventilated, and for enabling a required quantity or volume of heated air of any desired temperature to flow through each of the hot air pipes or passages relatively to and independently of the other pipes or passages, and by the use of current producing means which is efficient and economical in construction and operation.

It is also highly desirable to provide means for effecting and controlling the circulation of air through the entire heating system and through the rooms or compartments to be heated and ventilated, and more particularly to provide means for enabling a forced draught to be created in any desired one or more of the hot air pipes or passages, preferably by means of a single blower or air-current producing means for the entire system or for any desired number of such heated air pipes or passages.

In order to provide a simple, economical and effective means for accomplishing the above-mentioned objects and purposes I provide a power-driven blower or fan 16 which may be of any desired ordinary and well-known or suitable form and which comprises the usual rotor 17 having radial blades 18 rotative within the casing 19 which is provided with the usual inlet opening 20 and outlet opening or passage 21. An air discharge pipe 22 is connected at one end with the discharge passage 21 of the blower, and at its opposite end with the manifold 23 formed by preference of sheet metal and provided with a manifold chamber 24 enclosed within the manifold casing or walls. The manifold shown in the accompanying drawing comprises an outer manifold wall 25 of sheet metal the peripheral margin of which is attached to the upper peripheral margin of the outer casing 2 of the furnace 1, the lower wall 26 of said manifold being formed in this instance by the concave top wall of the furnace, said bottom manifold wall 26 being provided with a plurality of depending curved or angular discharge pipes or passages 27. One end of each of said pipes or passages is connected and adapted to communicate with the interior of said manifold chamber, and the discharge end or nozzle 28 of each of said discharge pipes is supported in operative position centrally of the receiving end 29 of a corresponding hot air pipe or passage 10 which communicates with the upper portion of the hot air chamber 8 of the furnace.

In the form of the device shown in Figs. 1 and 2, a tapered sleeve-shaped nozzle 30 is mounted in the receiving end 29 of each hot air pipe 10 in position to surround the discharge end of the nozzle 28 of the corresponding air pipe 27 leading from the manifold chamber 24 into such hot air pipe. Each of said sleeve-shaped nozzles 30 is open at both ends and mounted in operative position centrally of the inlet end of the corresponding hot air pipe and forms a tapered inner air inlet passage 31 which surrounds said nozzle 28. A tapered annular air inlet passage 32 is thus provided between the sleeve-shaped nozzle 30 and pipe 10. Said annular passage 32 surrounds the said sleeve-shaped nozzle 30 and communicates with the upper air chamber 8 of the furnace. A current of air forced through the nozzle 28 at a considerable velocity will thus cause a forced draught or air current to flow from the air chamber 8 of the furnace into and through the corresponding hot air passage 10. The diameter of the air pipe 27 is quite small compared with the diameter of the hot air pipe 10, so that no material obstruction is presented to the flow of hot air from the heating chamber into the hot air pipe.

Each return pipe or passage 13 is, by preference, provided with a suction pipe 33 the inner end of which is located centrally within such return pipe and the opposite end of which is connected either directly or indirectly as desired, with the blower. The intake end of the suction pipe is preferably located a considerable distance above the cool air flue opening 15 in the furnace casing so as to avoid danger of reversed flow of air from the furnace through the cool air duct.

The discharge pipe 22 which leads from the blower to the air manifold 23 is provided with a damper 37 having the usual operating lever 38. Any desired suitable means may be employed for operating the said damper as desired. For example, a damper-operating chain 40 is connected at its lower end with said damper-operating lever 38 for operating the damper in one direction; and a spring 39 is operatively connected with said damper for operating the same in an opposite direction to close the air-discharge passage 22 when the chain 40 is released, the upper end of said chain being located in any desired room or chamber to be heated or in any desired position for convenient operation.

From the foregoing it will be readily understood that when the blower 17 is in operation a current of air consisting of a portion of the air contained in the return pipe 13, will be drawn from the latter into and through the suction pipe 33 and inlet 20 of the blower and discharge through the discharge pipe 22 of the blower and into the air chamber 24 of the air manifold 23, and that a separate current of air will be caused to flow from said manifold air chamber through each of the respective discharge pipes 27 of which any desired number may be employed, one for each hot air conduit 10. The currents of air thus caused to flow through the discharge pipe or pipes 27 are discharged through the respective nozzles 28 of each of said discharge pipes into the mouth of an adjacent corresponding hot air conduit or passage 10 at an increased velocity as compared with the velocity of the current of air in the return pipe 13 and with that of the air in the hot air chamber 8 of the furnace. The current of air thus withdrawn from the return pipe 13 and discharged into the respective hot air conduits 10 through the corresponding discharge passages 27 and nozzles 28, creates a siphon-like effect and produces the effect of a forced draught in each hot air conduit 10 and causes air to be drawn into the mouth of each of said conduits from the air-containing heating chamber of the furnace.

The volume of the currents of air which is caused to flow into and through the respective hot air conduits 10 from the furnace chamber is governed by the size of the discharge openings 28 in the respective nozzles 28, said nozzles serving to govern and control the volume of the currents of air flowing through the respective discharge pipes 27 from the air chamber 24 of the manifold into the corresponding hot air conduits 10. In general, a nozzle 28 discharging into a hot air duct of considerable length and resistance will have a large jet opening, while a short hot air duct will need only a small jet opening. The several nozzles 28 preferably have the same outer diameter, so as to fit interchangeably on the several pipes 27, which latter may be identical, and so that the nozzles may be readily selected to produce the proper operating conditions. The velocity of the jets issuing from nozzles of different sizes is substantially the same, although the volume of air delivered will vary.

In order to provide simple and efficient means for governing and controlling the volume or flow of the currents of air through the discharge pipes 27 relatively to each other, and thereby controlling the flow of the currents of air through the hot air conduits 10 relatively to each other and independently of each other, the discharge nozzles 28 are by preference made interchangeable and provided with discharge openings 28' which may be of varying sizes or of any size which may be required to obtain or produce a current of air of the required volume for controlling the flow of heated air into the respective hot air conduits 10 from the furnace chamber.

Simple and efficient means is provided for moistening the air which is withdrawn from the cool air pipe or return pipe 13 and discharged through the air manifold chamber 24 and discharge passages 27 into the respective hot air conduits 10, for humidifying the heated air, as follows:

An open pan or water container 41 of suitable size for containing a quantity of water 42 for moistening or humidifying the air which is introduced into and caused to flow through the air chamber 24 of the manifold 23 is placed in said manifold chamber and provided with a water-supply pipe 43 which is adapted to be connected with a suitable source of water supply and leads into said water container. The water-supply pipe 43 is provided with a float-controlled valve 44 that is operatively connected with a float 45 fixed to a valve-operating lever 46 connected with said valve 44. The said float-controlled mechanism may be of any ordinary and well-known or suitable form and is adapted to open and permit the flow of water through said supply pipe 43 into the container 41 until the water thus admitted reaches the desired level whereupon the valve is closed by the raising of the float and the automatic operation of the valve-controlled lever 46. An overflow pipe 47 is provided which communicates with and leads from the container 41 at a point which corresponds with the level of the top surface of the water introduced into said container 41 when the water reaches the required level to operate and close said float-controlled valve mechanism.

In practice each branch discharge pipe 27 is provided with a nozzle 28 which may be of any suitable form having an outlet passage the size of which depends upon and corresponds with the requirements of the particular hot air conduit into which air is to be discharged by such nozzle for governing and controlling the flow of heated air through such conduit from the heating chamber of the furnace to the space to be heated or ventilated. For a hot air conduit of comparatively greater length or one having a less steep pitch or angle of inclination than another or others of the series of conduits, a nozzle having a relatively large discharge opening is employed. For those hot air conduits having a relatively steep pitch nozzles having relatively small discharge passages are employed according to the conditions and requirements in each instance necessary to the obtaining of the required air supply and temperature for the respective hot air conduits and spaces to be heated and ventilated.

The relatively cool air forced by the blower into the manifold chamber 24 is heated by the concave top wall of the furnace, thus conserving a substantial amount of heat which would otherwise be lost at this region in the conventional type of furnace. The outer walls of the manifold chamber remain comparatively cool. The air discharged from the manifold chamber 24 is further heated in its passage through the several pipes 27.

I claim:

1. In an apparatus of the class described, the combination with a furnace having a heating element, a casing surrounding the same and having an upper wall, said casing and its upper wall being spaced from said heating element to form an air heating chamber, and a hot air discharge conduit communicating with the upper portion of said heating chamber, of a second air chamber above said upper casing wall and exposed to heat transmitted through said upper wall from said heating chamber, means for supplying cool air under pressure to said second air chamber, and an air pipe communicating with said second air chamber and extending into said heating chamber with its discharge end in proximity to the mouth of said hot air discharge conduit for directing a jet of air into said conduit to cause an induced current of heated air to flow through said conduit from said heating chamber.

2. In an apparatus of the class described, the combination with a furnace having a heating element, a casing surrounding the same and having an upper wall, said casing and its upper wall being spaced from said heating element to form an air heating chamber, and a hot air discharge conduit communicating with the upper portion of said heating chamber, of a second air chamber above said upper casing wall, means for supplying cool air under pressure to said second air chamber, and an air pipe supported by and depending from said upper casing wall in communication with said second air chamber and having a discharge portion in proximity to the mouth of said hot air discharge conduit for directing a jet of air into said conduit to cause an induced current of heated air to flow through said conduit from said heating chamber.

3. In an apparatus of the class described, the combination with a furnace having a heating element, a casing surrounding the same and having an upper wall, said casing being spaced from said heating element to form an air heating chamber, and a hot air discharge conduit communicating with the upper portion of said heating chamber, of a cap secured above said upper casing wall to form therewith a second air chamber, means including a conduit connected to said cap for supplying air under pressure to said second air chamber, and an air pipe secured to said upper casing wall in communication with said second air chamber and extending into said heating chamber with its discharge end in proximity to the mouth of said hot air discharge conduit for directing a jet of air into said conduit to cause an induced current of heated air to flow through said conduit from said heating chamber.

FRANK A. HEADSON.